July 8, 1930.　　　J. H. KUNZ　　　1,770,077
REEL FOR HARVESTING MACHINES
Filed June 12, 1928　　　2 Sheets-Sheet 1
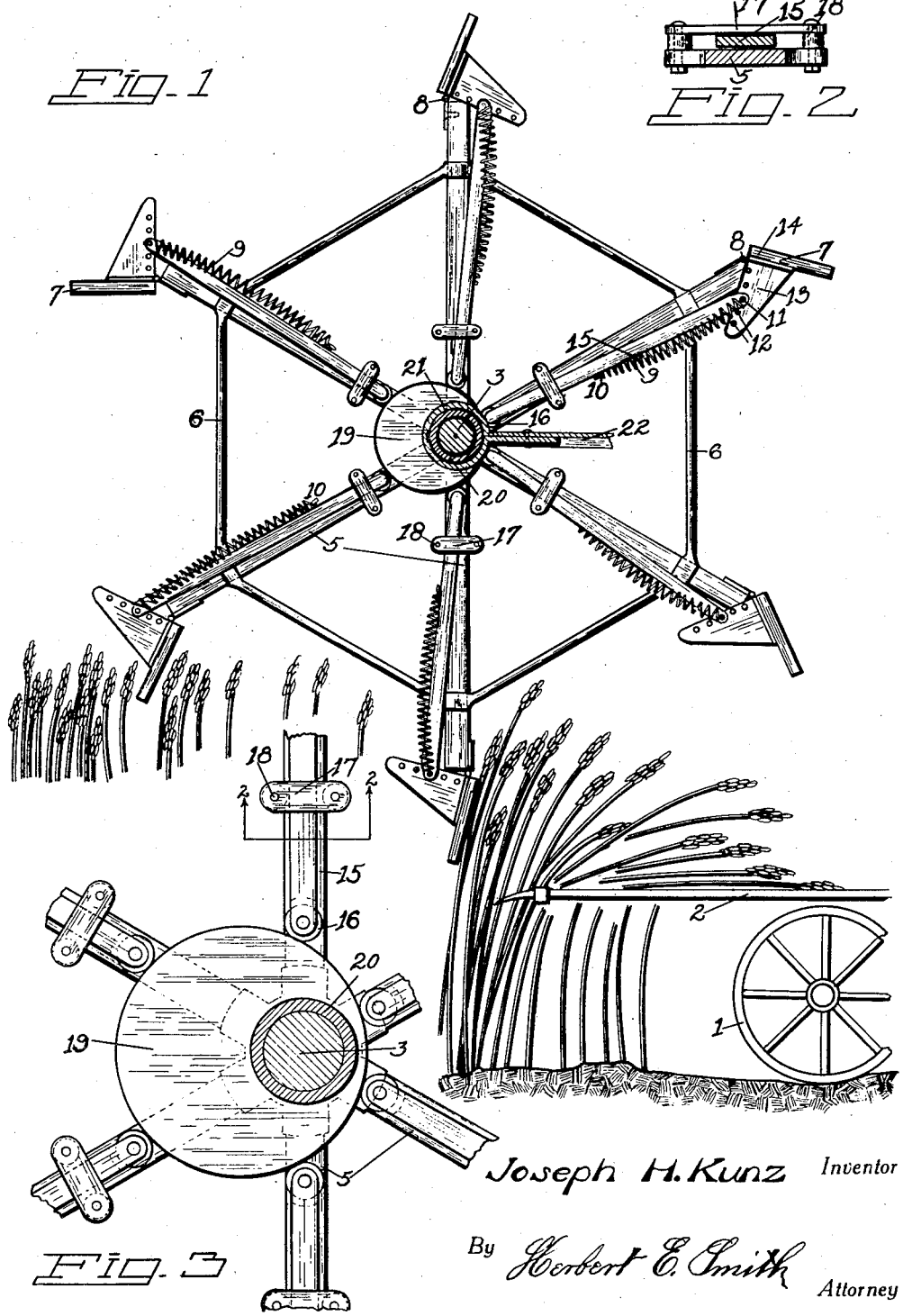
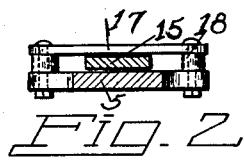
Joseph H. Kunz, Inventor
By Herbert E. Smith, Attorney July 8, 1930. J. H. KUNZ 1,770,077
REEL FOR HARVESTING MACHINES
Filed June 12, 1928   2 Sheets-Sheet 2
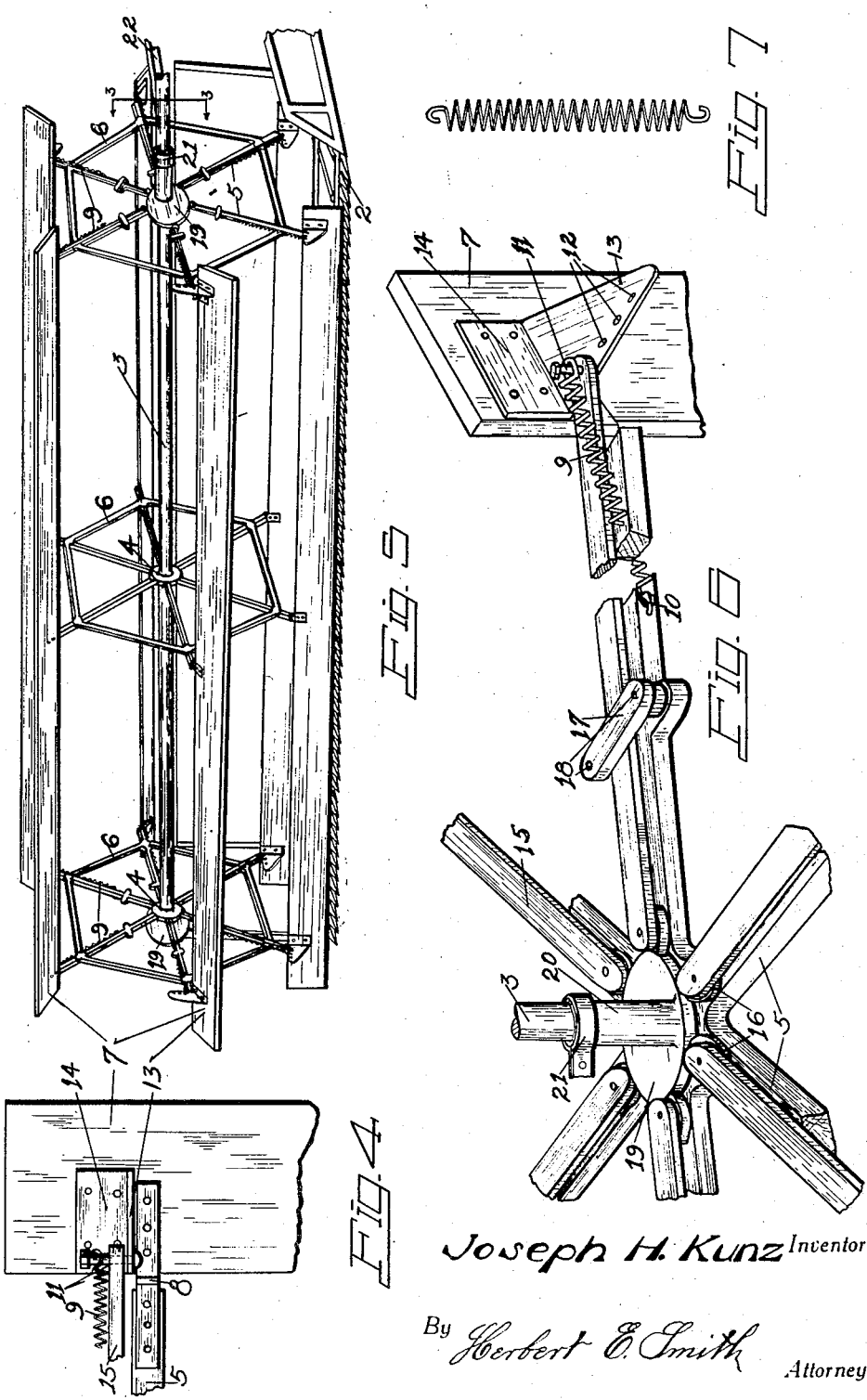
Joseph H. Kunz Inventor
By Herbert E. Smith, Attorney Patented July 8, 1930

1,770,077

UNITED STATES PATENT OFFICE

JOSEPH H. KUNZ, OF WILBUR, WASHINGTON

REEL FOR HARVESTING MACHINES

Application filed June 12, 1928. Serial No. 284,865.

My present invention relates to improvements in reels for harvesting machines used in combination with grain cutting mechanism of the harvester or with the grain cutting mechanism of a harvester-thresher.

The invention contemplates the use of feathering blades on the reel which blades are automatically moved into position so that as the reel revolves, the successive blades will enter or slip edgewise between the standing stalks of grain and push the upper ends of the standing grain or stalks over toward and above the cutter bar or cutting mechanism. By this feathering of the blades of the reel, each blade makes a clear entry into the standing grain without crushing or beating down the grain which would otherwise be lost or wasted. The feathering blades thus contact with and press the gathered grain toward the cutter of the harvester and hold the grain in position so that the cutter may perform its functions with facility and efficiency. The invention consists essentially in means carried by the reel whereby successive blades are feathered at the proper time to perform their functions with relation to the cutter as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1 is an end elevation of the reel with parts in section showing its relation to the cutter;

Fig. 2 is an enlarged sectional detail view at line 2—2 of Fig. 3;

Fig. 3 is an enlarged detail view partly in section at line 3—3 of Fig. 5, showing one of the two cams for actuating the feathering blades;

Fig. 4 is a detail view showing one of the hinges for a blade;

Fig. 5 is a perspective view of the reel showing its relation to a cutter;

Fig. 6 is an enlarged perspective detail view showing one of the cam devices and a portion of a blade moved thereby; and Fig. 7 is a detail of one of the springs used with the blades.

In order that the general assembly and relation of parts may readily be understood, I have shown in Figs. 1 and 5 a portion of the harvester or harvester-thresher including a wheel 1 and the cutting mechanism or cutter bar 2 for the standing grain.

The reel which is located above and slightly in advance of the cutting mechanism is supported upon the transversely arranged reel shaft 3 which is journaled in suitable bearings and revolved by suitable driving mechanism in usual manner.

The shaft is provided with a number of spaced collars 4 rigid therewith and from these collars the radial spokes 5 project, and these spokes are connected by means of brace arms 6 to form spaced frames on the reel. The blades 7 of the reel extend parallel with its shaft and they are hinged as at 8 at the outer ends of the spokes of the spaced frames.

The blades are provided with a plurality of springs as 9, each having one end anchored at 10 to a spoke and the other end is anchored to a bolt 11. This bolt is secured in a selected bolt hole 12 of a series of holes provided in the bracket arm 13, and the bracket arm has a rigid attaching plate 14 which is secured in suitable manner to the blade. The springs 9 are placed under tension so that they will hold the blades at an angle to their supporting spokes as indicated in Fig. 1, and the angle at which the blades are supported may be varied by selecting one of the series of bolt holes 12 for the bolt 11. The blades are feathered by cam mechanism, and they are returned to normal position by their springs.

The operating mechanism for feathering the blades includes pitmen 15 which are carried by the two end frames of the reel, the pitmen being disposed along the radial spokes of the frame. The outer end of each pitman is pivoted on a bolt 11 and the inner end of each pitman is provided with a cam roller 16. Guide straps 17 are secured to the spokes and the pitmen reciprocate through these straps for the purpose of operating the feathering blades. The straps are secured by bolts 18 to the spokes and they are spaced from the spokes in order to accommodate the pitmen.

A radial movement is imparted to each of the pitmen and for this purpose I utilize a pair of stationary cams or eccentrics 19, one at each end of the reel. These cams are located eccentrically to the reel shaft and they have bearing hubs 20 on the shaft. A hanger bracket 21 is secured on the stationary frame 22 for the support of the cams, and the latter are thus held in stationary position. Thus as the reel rotates or revolves, the cam rollers roll around on the periphery of the cams, and consequently the pitmen are reciprocated by this rolling contact of the rollers on the cams. The reciprocating movement of the pitmen of course oscillates the hinged blades, and as the blade enters the grain, as in Fig. 1, the outer edge of the blade clears the heads of the standing grain and passes down between the stalks without crushing or beating down the stalks. As the reel continues to revolve, the grain stalks are pushed to the rear as the thresher advances, and the stalks are thus bent over and above the cutter as in Fig. 1. The grain is thus presented to the cutter in such manner that the heads of the grain may be cut off clearly and without waste of grain.

Having thus fully described my invention, what I claim as new and desire to secure by Letters Patent is—

The combination in a rotary reel with its shaft and a stationary eccentric cam thereon, of a feathering blade hinged to the reel, a laterally projecting bracket fixed on the blade and spaced holes in the bracket, a pitman and a cam roller on the pitman for engagement with the eccentric cam, a guide strap on the reel for the pitman, a pivot bolt for the outer end of the pitman secured in a selected hole in the bracket, and a spring connected to the bolt and anchored to the reel at one side of the pitman.

In testimony whereof I affix my signature.

JOSEPH H. KUNZ.